US011595803B2

(12) United States Patent
Scully et al.

(10) Patent No.: US 11,595,803 B2
(45) Date of Patent: Feb. 28, 2023

(54) METHOD AND APPARATUS FOR PROTECTED AUTHENTICATED EMERGENCY SYSTEM HALT MECHANISM FOR DISASTER AND CYBER SCENARIOS

(71) Applicant: JPMorgan Chase Bank, N.A., New York, NY (US)

(72) Inventors: Alan Scully, Tokyo (JP); David Curry, Crows Nest (AU)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/340,480

(22) Filed: Jun. 7, 2021

(65) Prior Publication Data

US 2021/0385640 A1    Dec. 9, 2021

Related U.S. Application Data

(60) Provisional application No. 63/036,160, filed on Jun. 8, 2020.

(51) Int. Cl.
*H04W 4/90* (2018.01)
*H04W 12/06* (2021.01)
*H04L 9/40* (2022.01)

(52) U.S. Cl.
CPC .......... *H04W 4/90* (2018.02); *H04L 63/0861* (2013.01); *H04L 63/1416* (2013.01); *H04W 12/06* (2013.01)

(58) Field of Classification Search
CPC . H04L 63/0861; H04L 63/1416; H04W 12/06
USPC ....................................................... 455/404.1
See application file for complete search history.

(56) References Cited

U.S. PATENT DOCUMENTS

2017/0345112 A1\* 11/2017 Locke .................... G06Q 50/14
2018/0075397 A1\* 3/2018 Ronen ................. G06Q 10/067
2018/0096153 A1\* 4/2018 DeWitte ............. G06F 16/9535

\* cited by examiner

*Primary Examiner* — Maria El-Zoobi
(74) *Attorney, Agent, or Firm* — Greenblum & Bernstein, P.L.C.

(57) ABSTRACT

Various methods, apparatuses/systems, and media for implementing an emergency system halt mechanism are disclosed. A processor establishes a communication link with a plurality of data sources and a receiver. The receiver receives data related to disaster and/or cyber scenarios from the plurality of data sources. The processor automatically determines, by utilizing an intelligent activation system (IAS), whether to activate an emergency system halt mechanism (ESHM) upon detection of a disaster and/or a cyber scenario based on analyzing the received data and using pre-determined rules and artificial intelligence (AI)/machine learning (ML) models. The processor also automatically determines whether to activate or deactivate the ESHM based on a result of determination of the IAS. Once activated, a secure voice-based authentication processes designed to work in the limitations of cyber and disaster scenarios allow registered users to take actions such as halt or resume systems.

18 Claims, 6 Drawing Sheets

METHOD AND APPARATUS FOR PROTECTED AUTHENTICATED EMERGENCY SYSTEM HALT MECHANISM FOR DISASTER AND CYBER SCENARIOS

CROSS-REFERENCE TO RELATED APPLICATIONS

This application claims the benefit of priority from U.S. Provisional Patent Application No. 63/036,160, filed Jun. 8, 2020, which is herein incorporated by reference in its entirety.

TECHNICAL FIELD

This disclosure generally relates to data processing, and, more particularly, to methods and apparatuses for implementing an emergency system for automatically activating a protected authenticated emergency system halt mechanism for disaster (e.g., natural disaster, pandemic, terrorist attacks, etc.) and cyber scenarios for a predetermined amount of time.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

In a disaster or cyber scenario, management may wish to urgently halt systems for damage limitation or other reasons. As such scenarios may occur at any time, management may be at any location globally, which may include non-company locations. In addition, in scenarios such as natural disaster, mobile data networks may be congested to a point of inoperability and management may need to rely on company provided priority telephones. Correspondingly, in a cyber scenario, normal remote connection mechanisms may be locked down. Therefore, the system may need to operate under these limitations.

For additional security, it may be desirable that a halt mechanism should be disabled in normal situations and should only become active for use by authorized management in a disaster or a cyber scenario. While there should be the ability for manual activation of the mechanism (e.g., by resiliency management, cyber defense HQ, etc.), due to the urgency of such situations it may be desirable that there should also be automatic activation when appropriate scenarios occur (e.g., major cyber incident, terrorist attacks, major earthquake, or other major natural disasters, etc.).

SUMMARY

The present disclosure, through one or more of its various aspects, embodiments, and/or specific features or sub-components, may provide, among others, various systems, servers, devices, methods, media, programs, and platforms for implementing an emergency system for automatically activating, upon detection of a disaster or a cyber scenario by an intelligent activation system (IAS) that automatically triggers the activation, a protected authenticated emergency system halt mechanism to initiate system halt for a predetermined amount of time by utilizing rules and artificial intelligence (AI)/machine learning (ML) models, but the disclosure is not limited thereto. The present disclosure, through one or more of its various aspects, embodiments, and/or specific features or sub-components, may also provide, among others, various systems, servers, devices, methods, media, programs, and platforms for implementing an emergency system for automatically deactivating, upon non-detection of a disaster or a cyber scenario by an intelligent activation system (IAS) that automatically triggers the deactivation, a protected authenticated emergency system halt mechanism to initiate system halt by utilizing rules and artificial intelligence (AI)/machine learning (ML) models, but the disclosure is not limited thereto.

According to an aspect of the present disclosure, a method for implementing an emergency system halt mechanism by utilizing one or more processors and one or more memories is disclosed. The method may include: receiving data related to disaster and/or cyber scenarios from a plurality of data sources; determining, by an intelligent activation system (IAS), whether to activate an emergency system halt mechanism upon detection of a disaster and/or a cyber scenario based on analyzing the received data and using pre-determined rules and artificial intelligence (AI)/machine learning (ML) models.

According to another aspect of the present disclosure, the method may further include: automatically activating the emergency system halt mechanism upon positive detection of the disaster and/or the cyber scenario based on analyzing the received data and using the pre-determined rules and artificial intelligence (AI)/machine learning (ML) models.

According to yet another aspect of the present disclosure, wherein the emergency system halt mechanism is deactivated by default, and the method may further include: maintaining deactivated status of the emergency system halt mechanism upon negative detection of the disaster and/or the cyber scenario based on analyzing the received data and using the pre-determined rules and artificial intelligence (AI)/machine learning (ML) models; and automatically deactivating an active emergency system halt mechanism based upon negative detection of the disaster and/or the cyber scenario based on analyzing the received data and using the pre-determined rules and artificial intelligence (AI)/machine learning (ML) models.

According to further aspect of the present disclosure, wherein the plurality of data sources may include one or more of the following: disaster notification services, cyber management systems, news media, and automated network scanners to detect anomalies, but the disclosure is not limited thereto.

According to an additional aspect of the present disclosure, the method may further include: receiving input via a management console to control activation or deactivation of the emergency system halt mechanism.

According to yet another aspect of the present disclosure, the method may further include: preregistering users for voice authentication and secondary authentication; notifying the preregistered users upon detection of activation change of the emergency system halt mechanism via electronic messaging or automated voice call to corresponding registered devices of the preregistered users; and receiving a call from a preregistered user among the preregistered users by the emergency system halt mechanism to restart, or take other desired action on one or more critical systems.

According to an additional aspect of the present disclosure, wherein, when it is determined that the emergency system halt mechanism is activated, the method may further include: verifying the voice authentication and secondary authentication of the preregistered user who initiated the call; and automatically accepting an instruction to halt or take other desired action on one or more critical systems upon successful verification of the voice authentication and secondary authentication of the preregistered user who initiated the call.

According to a further aspect of the present disclosure, wherein, when it is determined that the emergency system halt mechanism is deactivated, the method may further include: automatically rejecting the received call to the emergency system halt mechanism; maintaining deactivation status of the emergency system halt mechanism; and notifying status information of the IAS and the emergency system halt mechanism to a corresponding registered device of the preregistered user who initiated the call and to a management console.

According to yet another aspect of the present disclosure, a system for implementing an emergency system is disclosed. The system may include a plurality of data sources including memories; and a processor operatively connected to the plurality of data sources via a communication network. The processor may be configured to: receive data related to disaster and/or cyber scenarios from a plurality of data sources; determine, by utilizing an intelligent activation system (LAS), whether to activate an emergency system halt mechanism upon detection of a disaster and/or a cyber scenario based on analyzing the received data and using pre-determined rules and artificial intelligence (AI)/machine learning (ML) models; and automatically determine whether to activate or deactivate the emergency system halt mechanism based on a result of determination of the IAS.

According to another aspect of the present disclosure, the processor may be further configured to: automatically activate the emergency system halt mechanism upon positive detection of the disaster and/or the cyber scenario based on analyzing the received data and using the pre-determined rules and artificial intelligence (AI)/machine learning (ML) models.

According to yet another aspect of the present disclosure, wherein the emergency system halt mechanism is deactivated by default, and the processor may be further configured to: maintain deactivated status of the emergency system halt mechanism upon negative detection of the disaster and/or the cyber scenario based on analyzing the received data and using the pre-determined rules and artificial intelligence (AI)/machine learning (ML) models; and automatically deactivate an active emergency system halt mechanism based upon negative detection of the disaster and/or the cyber scenario based on analyzing the received data and using the pre-determined rules and artificial intelligence (AI)/machine learning (ML) models.

According to an additional aspect of the present disclosure, the processor may be further configured to: receiving input via a management console to control activation or deactivation of the emergency system halt mechanism.

According to yet another aspect of the present disclosure, the processor may be further configured to: preregister users for voice authentication and secondary authentication; notify the preregistered users upon detection of activation change of the emergency system halt mechanism via electronic messaging or automated voice call to corresponding registered devices of the preregistered users; and receive a call from a preregistered user among the preregistered users by the emergency system halt mechanism to restart, or take other desired action on one or more critical systems.

According to an additional aspect of the present disclosure, wherein, when it is determined that the emergency system halt mechanism is activated, the processor may be further configured to: verify the voice authentication and secondary authentication of the preregistered user who initiated the call; and automatically accept an instruction to halt or take other desired action on one or more critical systems upon successful verification of the voice authentication and secondary authentication of the preregistered user who initiated the call.

According to a further aspect of the present disclosure, wherein, when it is determined that the emergency system halt mechanism is deactivated, the processor may be further configured to: automatically reject the received call to the emergency system halt mechanism; maintain deactivation status of the emergency system halt mechanism; and notify status information of the IAS and the emergency system halt mechanism to a corresponding registered device of the preregistered user who initiated the call and to a management console.

According to a further aspect of the present disclosure, a non-transitory computer readable medium configured to store instructions for implementing an emergency system is disclosed. The instructions, when executed, may cause a processor to perform the following: receiving data related to disaster and/or cyber scenarios from a plurality of data sources; determining, by utilizing an intelligent activation system (IAS), whether to activate an emergency system halt mechanism upon detection of a disaster and/or a cyber scenario based on analyzing the received data and using pre-determined rules and artificial intelligence (AI)/machine learning (ML) models; and automatically determining whether to activate or deactivate the emergency system halt mechanism based on a result of determination of the IAS.

According to another aspect of the present disclosure, the instructions, when executed, may further cause the processor to perform the following: automatically activating the emergency system halt mechanism upon positive detection of the disaster and/or the cyber scenario based on analyzing the received data and using the pre-determined rules and artificial intelligence (AI)/machine learning (ML) models.

According to yet another aspect of the present disclosure, wherein the emergency system halt mechanism is deactivated by default, and the instructions, when executed, may further cause the processor to perform the following: maintaining deactivated status of the emergency system halt mechanism upon negative detection of the disaster and/or the cyber scenario based on analyzing the received data and using the pre-determined rules and artificial intelligence (AI)/machine learning (ML) models; and automatically deactivating an active emergency system halt mechanism based upon negative detection of the disaster and/or the cyber scenario based on analyzing the received data and using the pre-determined rules and artificial intelligence (AI)/machine learning (ML) models.

According to an additional aspect of the present disclosure, the method may further include: receiving input via a management console to control activation or deactivation of the emergency system halt mechanism.

According to yet another aspect of the present disclosure, the instructions, when executed, may further cause the processor to perform the following: preregistering users for voice authentication and secondary authentication; notifying the preregistered users upon detection of activation change of the emergency system halt mechanism via electronic messaging or automated voice call to corresponding registered devices of the preregistered users; and receiving a call from a preregistered user among the preregistered users by the emergency system halt mechanism to restart, or take other desired action on one or more critical systems.

According to an additional aspect of the present disclosure, wherein, when it is determined that the emergency system halt mechanism is activated, the instructions, when executed, may further cause the processor to perform the following: verifying the voice authentication and secondary authentication of the preregistered user who initiated the call; and automatically accepting an instruction to halt or take other desired action on one or more critical systems upon successful verification of the voice authentication and secondary authentication of the preregistered user who initiated the call.

According to a further aspect of the present disclosure, wherein, when it is determined that the emergency system halt mechanism is deactivated, the instructions, when executed, may further cause the processor to perform the following: automatically rejecting the received call to the emergency system halt mechanism; maintaining deactivation status of the emergency system halt mechanism; and notifying status information of the IAS and the emergency system halt mechanism to a corresponding registered device of the preregistered user who initiated the call and to a management console.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
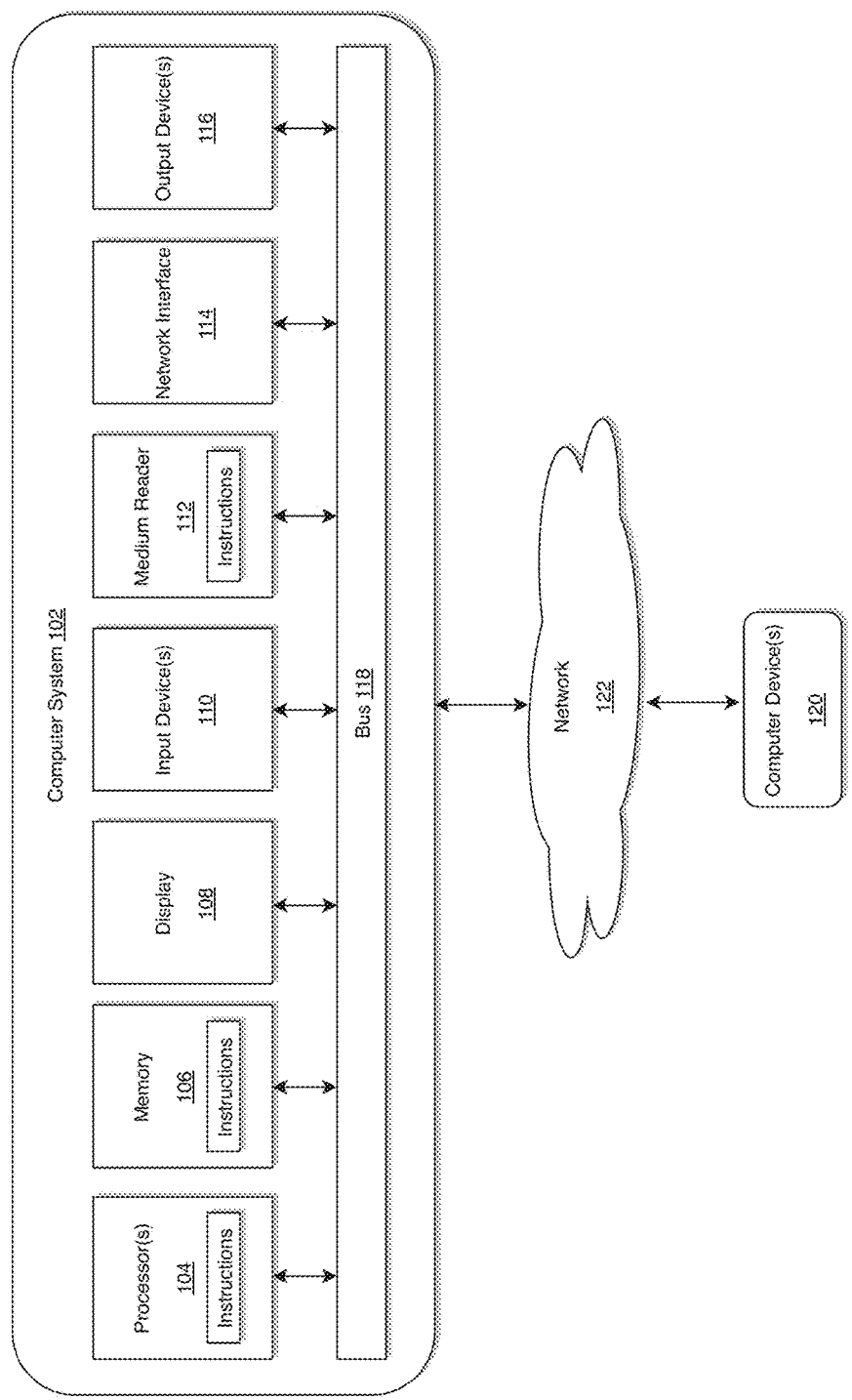
FIG. 1 illustrates a computer system for implementing an emergency system halt mechanism in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, mechanism, units, engines, tools, devices and/or modules. Those skilled in the art will appreciate that these blocks, units, engines, tools, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, engines, tools, devices, and/or modules being implemented by microprocessors or similar, they may be programmed using software (e.g., microcode) to perform various functions discussed herein and may optionally be driven by firmware and/or software. Alternatively, each block, unit, engine, tool device, and/or module may be implemented by dedicated hardware, or as a combination of dedicated hardware to perform some functions and a processor (e.g., one or more programmed microprocessors and associated circuitry) to perform other functions. Also, each block, unit, engine, tool, device, and/or module of the example embodiments may be physically separated into two or more interacting and discrete blocks, units, engines, tools, devices, and/or modules without departing from the scope of the inventive concepts. Further, the blocks, units, engines, tools, devices, and/or modules of the example embodiments may be physically combined into more complex blocks, units, engines, tools, devices, and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, bluray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth. Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing an emergency system for automatically deactivating, upon detection of a disaster or a cyber scenario, protected authenticated emergency systems for a predetermined amount of time, but the disclosure is not limited thereto.

Figure 2:
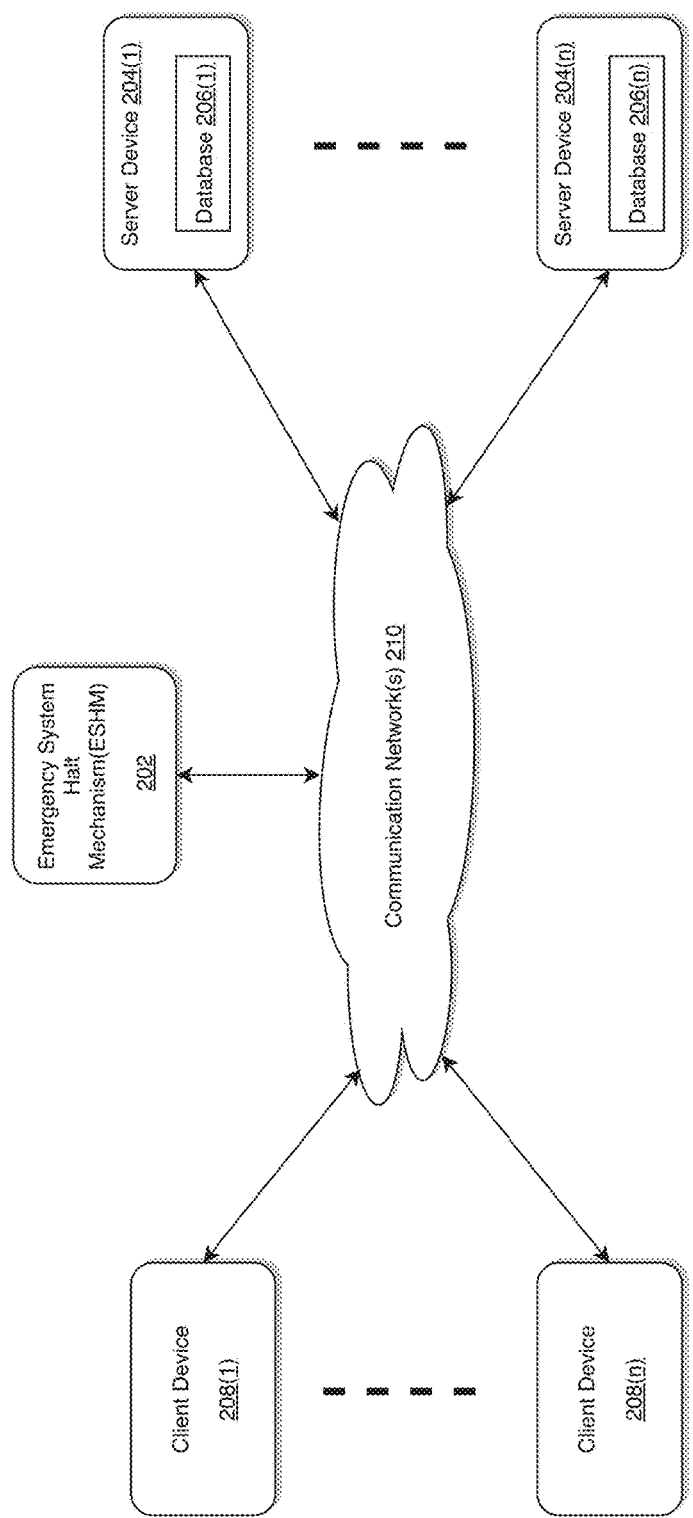
FIG. 2 illustrates an exemplary network diagram of an emergency system halt mechanism in accordance with an exemplary embodiment.

Referring to FIG. 2, a schematic of an exemplary network environment 200 for implementing an emergency system halt mechanism (ESHM) of the instant disclosure is illustrated.

According to exemplary embodiments, the above-described problems associated with conventional system may be overcome by implementing an ESHM 202 as illustrated in FIG. 2 to automatically activate, upon detection of a disaster or a cyber scenario by an intelligent activation system (IAS), a protected authenticated emergency system halt mechanism to initiate system halt or any other desired actions for a predetermined amount of time by utilizing rules and artificial intelligence (AI)/machine learning (ML) models, but the disclosure is not limited thereto.

The ESHM 202 may be the same or similar to the computer system 102 as described with respect to FIG. 1.

The ESHM 202 may store one or more applications that can include executable instructions that, when executed by the ESHM 202, cause the ESHM 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ESHM 202 itself, may be located in virtual server(s) running in a cloud-based computing environment rather than being tied to one or more specific physical network computing devices. Also, the application(s) may be running in one or more virtual machines (VMs) executing on the ESHM 202. Additionally, in one or more embodiments of this technology, virtual machine(s) running on the ESHM 202 may be managed or supervised by a hypervisor.

In the network environment 200 of FIG. 2, the ESHM 202 is coupled to a plurality of server devices 204(1)-204(n) that hosts a plurality of databases 206(1)-206(n), and also to a plurality of client devices 208(1)-208(n) via communication network(s) 210. A communication interface of the ESHM 202, such as the network interface 114 of the computer system 102 of FIG. 1, operatively couples and communicates between the ESHM 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ESHM 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ESHM 202 may be a standalone device or integrated with one or more other devices or apparatuses, such as one or more of the server devices 204(1)-204(n), for example. In one particular example, the ESHM 202 may be hosted by one of the server devices 204(1)-204(n), and other arrangements are also possible. Moreover, one or more of the devices of the ESHM 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ESHM 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the ESHM 202 that may be configured for automatically deactivating, upon detection of a disaster or a cyber scenario, protected authenticated emergency systems (i.e., critical systems) for a predetermined amount of time, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the ESHM 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ESHM 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ESHM 202, the server devices 204(1)-204(n), or the client devices 208(1)-208(n), for example, may be configured to operate as virtual instances on the same physical machine. For example, one or more of the ESHM 202, the server devices 204(1)-204(n), or the client devices 208(1)-208(n) may operate on the same physical device rather than as separate devices communicating through communication network(s) 210. Additionally, there may be more or fewer ESHMs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
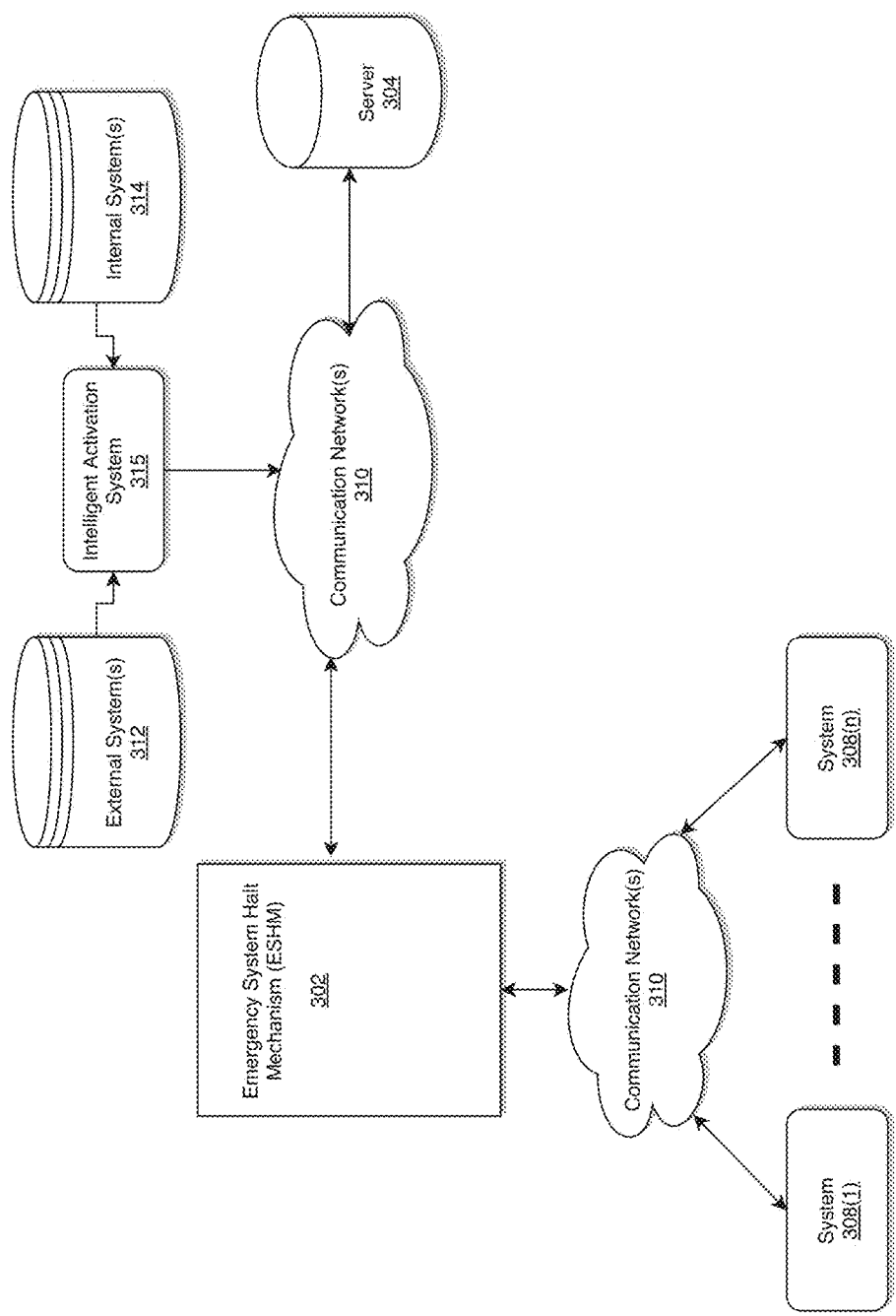
FIG. 3 illustrates a system diagram for implementing an emergency system halt mechanism in accordance with an exemplary embodiment.

FIG. 3 illustrates a system diagram for implementing an emergency system halt mechanism (ESHM) in accordance with an exemplary embodiment.

As illustrated in FIG. 3, in the system 300, according to exemplary embodiments, the ESHM 302 may be connected to a server 304, an external system 312, and an internal system 314 via a communication network 310, but the disclosure is not limited thereto. For example, according to exemplary embodiments, the ESHM 302 may be connected to any desired internal and or external systems besides the external system 312 and the internal system 314.

According to exemplary embodiment, the ESHD 302 is described and shown in FIG. 3 as including the ESHM 302, although it may include other rules, policies, modules, databases, or applications, for example. According to exemplary embodiments, the external system 312 and the internal system 314 may be connected to an intelligent action system (IAS) 315. According to exemplary embodiments, the server 304 may also be a database which may be configured to store information including the metadata, but the disclosure is not limited thereto. According to exemplary embodiments, the ESHM 302 may also be referred to as a processor.

According to exemplary embodiments, the IAS 315 may be configured to receive continuous feed of data from the server 304 and the external system 312 and the internal system 314 via the communication network 310. According to exemplary embodiments, the ESHM 302 may also be configured to communicate with the systems 308(1)-308(n) (e.g., protected authenticated critical systems) via the communication network 310, but the disclosure is not limited thereto.

According to exemplary embodiments, artificial intelligence/Machine learning (AI/ML) models may be trained using CPUs and GPUs to infer decision based on received inputs as described with respect to FIG. 5 and FIG. 6 below, but the disclosure is not limited thereto.

As will be described below, the IAS 315 may be configured to receive data related to disaster and/or cyber scenarios from a plurality of data sources; determine whether to activate an ESHM 306 upon detection of a disaster and/or a cyber scenario based on analyzing the received data and using pre-determined rules and artificial intelligence (AI)/machine learning (ML) models, but the disclosure is not limited thereto.

According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the systems 308(1)-308(*n*) may communicate with the ESHM 302 via broadband or cellular communication. Of course, these embodiments are merely exemplary and are not limiting or exhaustive.

Figure 4:
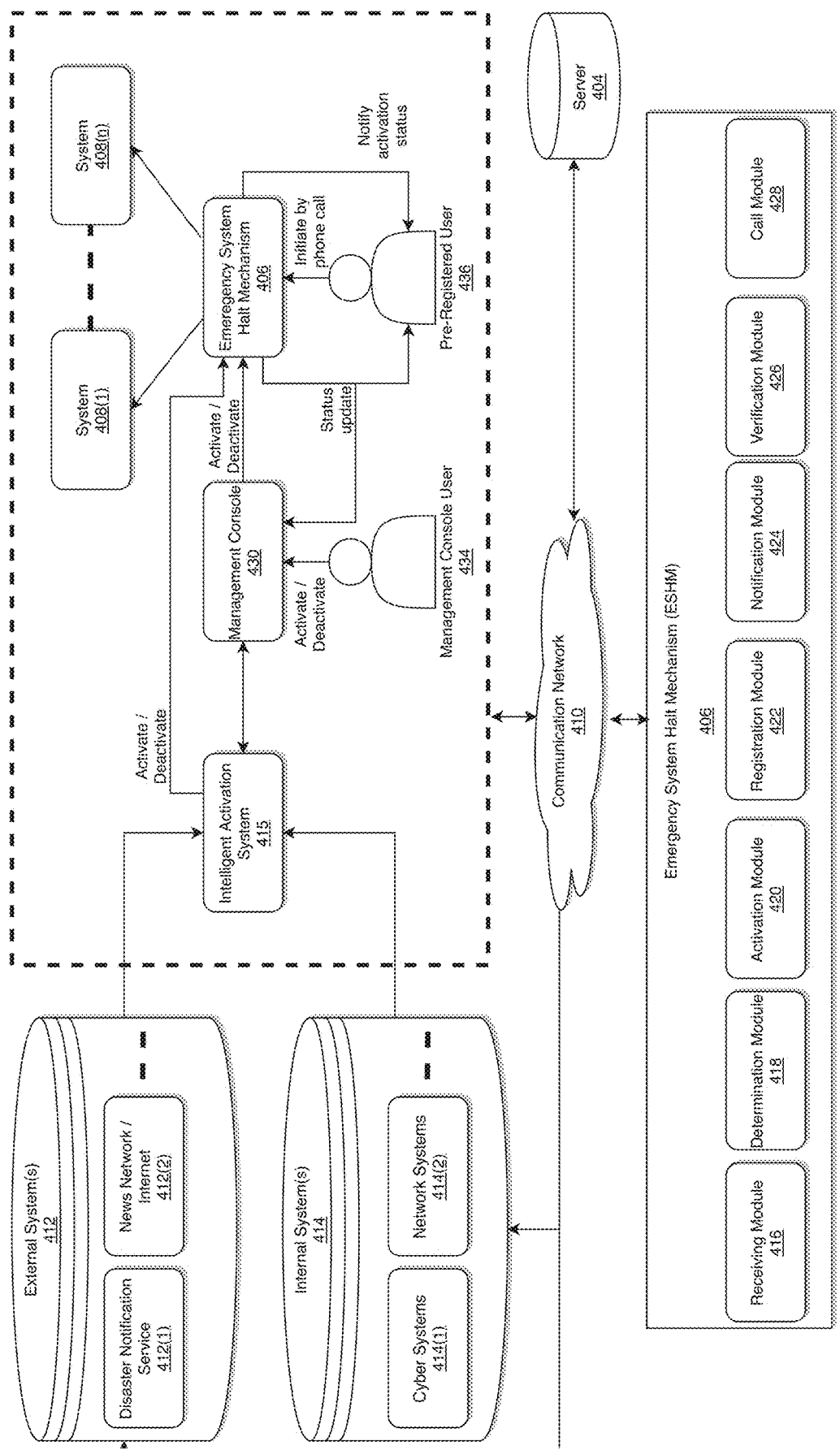
FIG. 4 illustrates a system diagram for implementing an emergency system halt mechanism of FIG. 3 in accordance with an exemplary embodiment.

FIG. 4 illustrates a system diagram for implementing an emergency system halt mechanism (ESHM) of FIG. 3 in accordance with an exemplary embodiment. As illustrated in FIG. 4, the system 400 may include an ESHM 406, an external system 412, an internal system 414, a server 404, a communication network 410, an intelligent activation system (IAS) 415, a management console 430, and one or more systems 408(1)-408(*n*) that are subjected to the ESHM 406 for system halt. For clarity, various modules embedded within the ESHM 406 are illustrated separately in FIG. 4.

According to exemplary embodiments, as illustrated in FIG. 4, the ESHM 406 may include a receiving module 416, a determination module 418, an activation module 420, a registration module 422, a notification module 424, a verification module 426 and a call module 428, but the disclosure is not limited thereto.

According to exemplary embodiments, the external system 412 and the internal system 414 with reference to FIG. 4 may be same or similar to the external system 312 and the internal system 314 as illustrated in FIG. 3. Further, the server 404 with reference to FIG. 4 may be same or similar to the server 304 as illustrated in FIG. 3, and the communication network 410 with reference to FIG. 4 may be same or similar to the communication network 310 as illustrated in FIG. 3.

According to exemplary embodiments, the ESHM 406 may include various systems that are managed and operated by an organization by utilizing user's devices.

Referring to FIG. 4, the process may be executed via the communication network 410 which may comprise plural networks as described above. For example, in an exemplary embodiment, the various components of the IAS 415 may communicate with the external system 412, the internal system 414, and the server 304 via the communication network 410. Of course, these embodiments are merely exemplary and are not limiting or exhaustive. A plurality of systems 408(1)-408(*n*) may be configured to be connected to the ESHM 406 via the communication network 410.

According to exemplary embodiments, each of the receiving module 416, the determination module 418, the activation module 420, the registration module 422, the notification module 424, the verification module 426 and the call module 428 of the ESHM 406 may be implemented by microprocessors or similar, they may be programmed using software (e.g., microcode) to perform various functions discussed herein. Alternatively, each of the receiving module 416, the determination module 418, the activation module 420, the registration module 422, the notification module 424, the verification module 426 and the call module 428 of the ESHM 406 may be implemented by dedicated hardware, or as a combination of dedicated hardware to perform some functions and a processor (e.g., one or more programmed microprocessors and associated circuitry) to perform various functions discussed herein as well as other functions. Also, according to exemplary embodiments, each of the receiving module 416, the determination module 418, the activation module 420, the registration module 422, the notification module 424, the verification module 426 and the call module 428 of the ESHM 406 may be physically separated into two or more interacting and discrete blocks, units, engines, devices, and/or modules without departing from the scope of the inventive concepts.

According to exemplary embodiments, the communication network 410 establishes a link among the IAS 415, the external system 412, the internal system 414, the server 404, the communication network 410, the management console 430, the ESHM 406, and the one or more systems 408(1)-408(*n*).

As will be described below, the overall system may be composed of three components: (i) IAS 415, (ii) ESHM 406, and (iii) training simulation mode, but the disclosure is not limited thereto.

I. Intelligent Activation System (IAS)

According to exemplary embodiments, by default the IAS 415 is always active. The IAS 415 may be configured to incorporate one or more of the following processes, but the disclosure is not limited thereto.

First, for example, the IAS 415 may be configured to receive data feed from disaster services, e.g., disaster notification service 412(1), news network/internet 412(2), etc., via the external systems 412, where available. For example, many countries have notification of major earthquakes for which the IAS 415 may be configured to monitor for relevant notices (e.g., earthquake of a particular level in particular locations).

Second, the IAS 415 may be configured to receive data feed from cyber management system, e.g., cyber systems 414(1), network systems 414(2), etc., via internal systems 314. For example, the IAS 415 may react to a cyber incident notice of a particular severity or related to particular systems.

Third, upon detection of a disaster and/or a cyber scenario based on analyzing the received data feed and using predetermined rules and AI/ML models, the IAS 415 may determine whether to activate the ESHM 406. ESHM 406 may be activated manually. For example, resiliency management (e.g., management console user 434) may activate the ESHM 406 manually for a period of time by utilizing the management console 430, such as when terrorist activity or potential pandemic occurs. Cyber defense (e.g., management console user 434) may manually activate the ESHM 406 if it detects a client or vendor is facing a cyber-attack, etc., by utilizing the management console 430.

Other authorized personnel (e.g., management console user 434) may manually active the ESHM 406 as a result of either (1) automated scanning of news sources or (2) automated scanning of network to detect anomalies by the IAS 415.

(1) Automated Scanning of News Sources.

For example, using a trained machine learning algorithm, the IAS 415 may detect news articles which may indicate such scenarios are ongoing. The algorithm may have the ability to score confidence level and activation of ESHM 406 may be automatically triggered or referred for manual activation depending on confidence level.

(2) Automated Scanning of Network to Detect Anomalies.

For example, cyber systems may use artificial intelligence (AI) to detect anomalies in behavior (network traffic, user usage pattern, etc.) which may indicate a cyber-attack. The machine learning algorithm may have the ability to score confidence level and activation of ESHM 406 may be automatically triggered or referred for manual activation depending on confidence level.

Correspondingly, the ESHM 406 may also to be configured to be deactivated using the same processes first through third as disclosed above when negative scenarios are detected.

According to exemplary embodiments, activation of the ESHM 406 may have a time limit associated with it which may cause activation to expire unless manually or automatically extended by the same processes first through third disclosed above.

According to exemplary embodiments, on activation, reactivation or deactivation, the ESHM 406 may be configured to notify the authorized management via electronic messaging (e.g., text, email) or automated voice call to their registered device, which may be expected to be a priority cell phone with SLA (service-level agreement) for disaster scenarios from an appropriate providers. This may ensure that the authorized management is on alert and is aware that the ESHM 406 is available. According to exemplary embodiments, the authorized management may include of a group of people, to mitigate available people loss.

II. Emergency System Halt Mechanism

In various disaster scenarios, mobile data networks may be inoperable. However voice and short message networks via priority devices mentioned in I. and the IAS 415 are expected to be available.

On activation of the ESHM 406, management (e.g., management console user 434) may execute a telephone call to the ESHM 406 to initiate system halt for systems 408(1)-408(n). According to exemplary embodiments, the system will be trained in advance using a machine learning algorithm to recognize the voices of authorized management individuals.

According to exemplary embodiments, on receiving a telephone call, the ESHM 406 may ask the caller (i.e., pre-registered user 436) to repeat a series of phrases until it determines with certainty that the caller is an authorized management individual.

Once the ESHM 406 determines that the voice is authentic, according to exemplary embodiments, the ESHM 406 may execute a second level of authentication which could be either automatic or manual.

According to exemplary embodiments, this voice authentication may be automatic—for example, if the pre-registered user 436 is calling from a company provided emergency phone or a predetermined location (e.g., home).

Alternatively, this voice authentication may be manual (e.g., when no automatic method succeeds or when a manual only method is configured)—for example, the ESHM 406 could ask the pre-registered user 436 to recite a predetermined passphrase or number or to answer a number of security questions. According to exemplary embodiments, the manual mechanisms to use and the corresponding expected responses would be set up at time of training and known only to the individual.

According to exemplary embodiments, secondary methods of authentication which rely on, for example, secure ID tokens, data connections, etc., may be avoided as they may not be relied upon in the situations where this system would be activated.

Once the second level of authentication succeeds, the ESHM 406 may be configured to trigger the system halt or other desired actions (e.g., halting one or more of the systems 408(1)-408(n); restarting one or more of the systems 408(1)-408(n); halting all of the systems 408(1)-408(n), etc., but the disclosure is not limited thereto) via a mechanism coded into the systems, and notify management individuals. Notification may include who initiated the halt or other desired actions and details of the authentications passed, but the disclosure is not limited thereto.

III. Training Simulation Mode

The ESHM 406 may be configured for training purposes to allow it to be confirmed that authenticated individuals can use the system, and to also allow confirmation that unauthenticated individuals are rejected.

Referring to FIG. 4, exemplary non-limiting details regarding system halt or other desired actions will be described below.

According to exemplary embodiments, the receiving module 416 may be configured to receive data related to disaster and/or cyber scenarios from the plurality of data sources, such as, disaster notification service 412(1), news network/internet 412(2), cyber systems 414(1), network systems 414(2), etc.

According to exemplary embodiments, the determination module 418 may be configured to determine whether to activate the ESHM 406 upon detection of a disaster and/or a cyber scenario, by the IAS 415, based on analyzing the received data received by the receiving module 416 and using pre-determined rules and artificial intelligence (AI)/machine learning (ML) models.

According to exemplary embodiments, the determination module 418 may be configured to automatically determine whether to activate or deactivate the ESHM 406 based on a result of determination of the IAS 415.

According to exemplary embodiments, the activation module 420 may be configured to automatically activate the ESHM 406 upon positive detection of the disaster and/or the cyber scenario based on analyzing the received data received by the receiving module 416 from the IAS 415 and using the pre-determined rules and artificial intelligence (AI)/machine learning (ML) models utilized by the IAS 415.

According to exemplary embodiments, the ESHM 406 is in deactivated state by default. The ESHM 406 may be configured to automatically maintain the deactivated status of the ESHM 406 upon negative detection of the disaster and/or the cyber scenario based on analyzing the received data received by the receiving module 416 and using the pre-determined rules and artificial intelligence (AI)/machine learning (ML) models; and automatically deactivating the ESHM 406 based on a negative detection, by the IAS 415, of the disaster and/or the cyber scenario based on analyzing the received data received by the receiving module 416 and using the pre-determined rules and artificial intelligence (AI)/machine learning (ML) models.

According to exemplary embodiments, the plurality of data sources may include one or more of the following: disaster notification services, cyber management systems, news media, and automated network scanners to detect anomalies, but the disclosure is not limited thereto.

According to exemplary embodiments, the receiving module 416 may be configured to receive input via the management console 430 to control activation or deactivation of the ESHM 406.

According to exemplary embodiments, the registration module 422 may be configured to preregister users 436 for voice authentication and secondary authentication and the notification module 424 may be configured to notify the preregistered users 436 upon detection of activation change of the ESHM 406 via electronic messaging or automated voice call through the call module 428 to corresponding registered devices of the preregistered users 436. The ESHM 406 may receive a call via the call module 428 from a preregistered user among the preregistered users 436 to restart, or take other desired actions on one or more of the systems 408(1)-408(n) (e.g., halting one or more of the systems 408(1)-408(n); restarting one or more of the systems 408(1)-408(n); halting all of the systems 408(1)-408(n), etc., but the disclosure is not limited thereto). According to exemplary embodiments, the systems 408(1)-408(n) may be referred to as critical systems.

According to exemplary embodiments, when the determination module 418 determines that the ESHM 406 is activated, the verification module 426 may be configured to verify the voice authentication and secondary authentication of the preregistered user 436 who initiated the call. The ESHM 406 may be configured to automatically accept instructions to halt or take other desired actions one ore or more of the systems 408(1)-408(n) (e.g., halting one or more of the systems 408(1)-408(n); restarting one or more of the systems 408(1)-408(n); halting all of the systems 408(1)-408(n), etc., but the disclosure is not limited thereto) upon successful verification of the voice authentication and secondary authentication of the preregistered user 436 who initiated the call by the verification module 426.

According to exemplary embodiments, when the determination module 418 determines that the ESHM 406 is deactivated, the call module 428 may automatically reject the received call to the ESHM 406; and the ESHM 406 may maintain its deactivation status. The notification module 424 may be configured to notify status information of the IAS 415 and the ESHM 406 to a corresponding registered device of the preregistered user 436 who initiated the call and to the management console 430.

Figure 5:
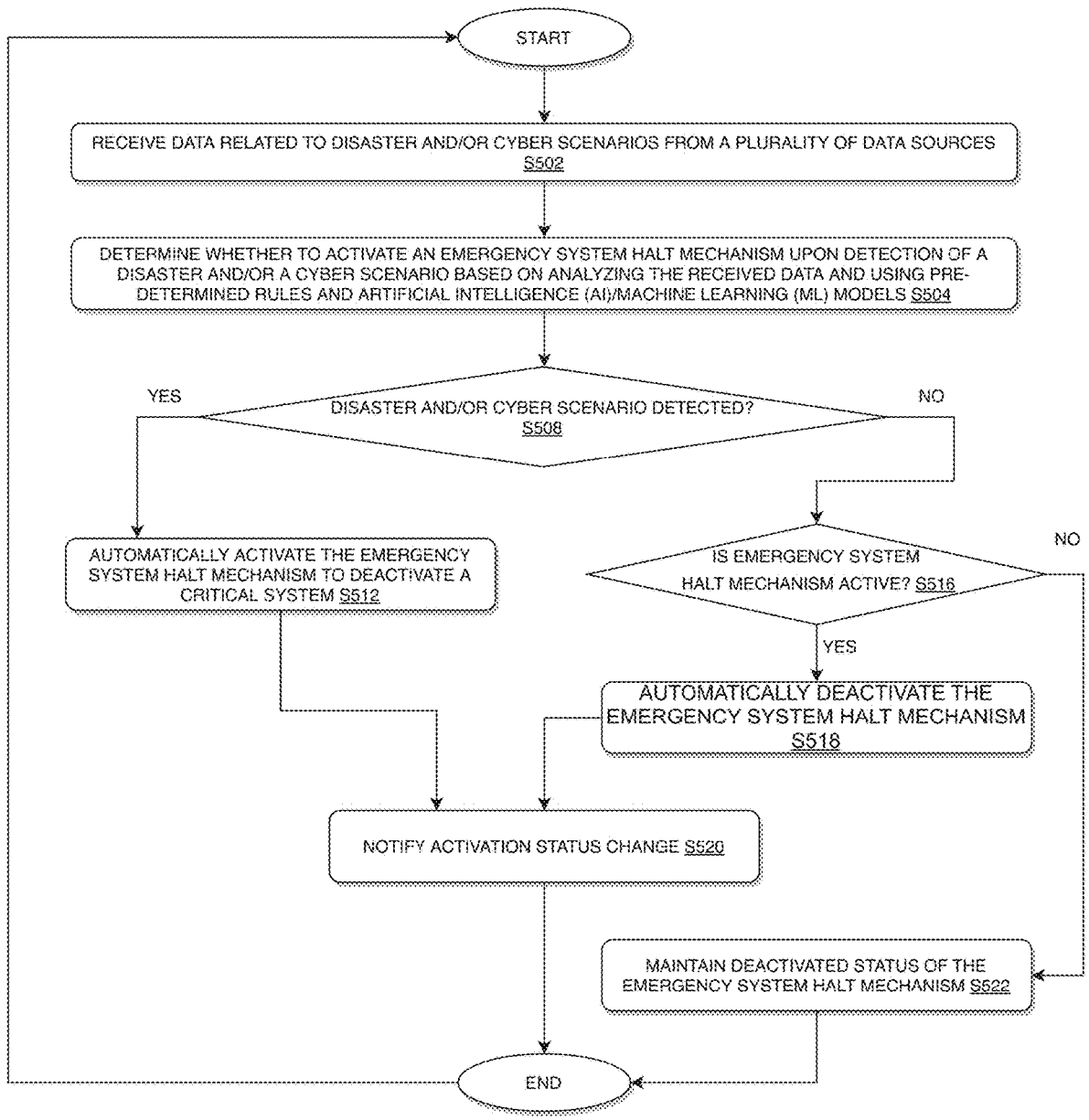
FIG. 5 illustrates a flow chart for implementing an emergency system halt mechanism in accordance with an exemplary embodiment.

FIG. 5 illustrates a flow chart for implementing an emergency system halt mechanism in accordance with an exemplary embodiment.

It will be appreciated that the illustrated process 500 and associated steps may be performed in a different order, with illustrated steps omitted, with additional steps added, or with a combination of reordered, combined, omitted, or additional steps.

In the process 500 of FIG. 5, at step S502, data may be received related to disaster and/or cyber scenarios from a plurality of data sources.

According to exemplary embodiments, at step S504, it may be determined whether to activate an emergency system halt mechanism (ESHM) upon detection of a disaster and/or a cyber scenario based on analyzing the received data and using pre-determined rules and artificial intelligence (AI)/machine learning (ML) models.

According to exemplary embodiments, at step S508, a determination is made whether disaster and/or cyber scenario is detected.

In step S508, if it is determined that disaster and/or cyber scenario is detected, at step S512, the process 500 automatically activate the ESHM to deactivate a critical system. At step S520, the process 500 automatically notifies activation status change.

In step S508, if it is determined that disaster and/or cyber scenario is not detected, at step S516, the process 500 determines whether the ESHM is active or not.

In step S516, if it is determined that the ESHM is active, at step S518, the process 500 automatically deactivate the ESHM and the process proceed to step S520 to notify activation status change.

In step S516, if it is determined that the ESHM is not active, at step S522, the process 500 maintains deactivated status of the ESHM.

According to exemplary embodiments, the process 500 may further include receiving input via a management console to manually control activation or deactivation of the ESHM.

According to exemplary embodiments, the process 500 may further include: preregistering users for voice authentication and secondary authentication; notifying the preregistered users upon detection of activation change of the ESHM via electronic messaging or automated voice call to corresponding registered devices of the preregistered users; and receiving a call from a preregistered user among the preregistered users by the emergency system halt mechanism to restart or take other desired actions on one or more critical systems (e.g., halting one or more critical systems; restarting one or more critical systems; halting all of the critical systems, etc., but the disclosure is not limited thereto).

According to exemplary embodiments, when it is determined that the ESHM is activated, the process 500 may further include: verifying the voice authentication and secondary authentication of the preregistered user who initiated the call; automatically accepting instructions to halt or take other desired actions on one or more critical systems (e.g., halting one or more critical systems; restarting one or more critical systems; halting all of the critical systems, etc., but the disclosure is not limited thereto) upon successful verification of the voice authentication and secondary authentication of the preregistered user who initiated the call.

According to exemplary embodiments, when it is determined that the ESHM is deactivated, the process 500 may further include: automatically rejecting the received call to the emergency system halt mechanism; maintaining deactivation status of the emergency system halt mechanism; and notifying status information of the IAS and the emergency system halt mechanism to a corresponding registered device of the preregistered user who initiated the call and to a management console.

Figure 6:
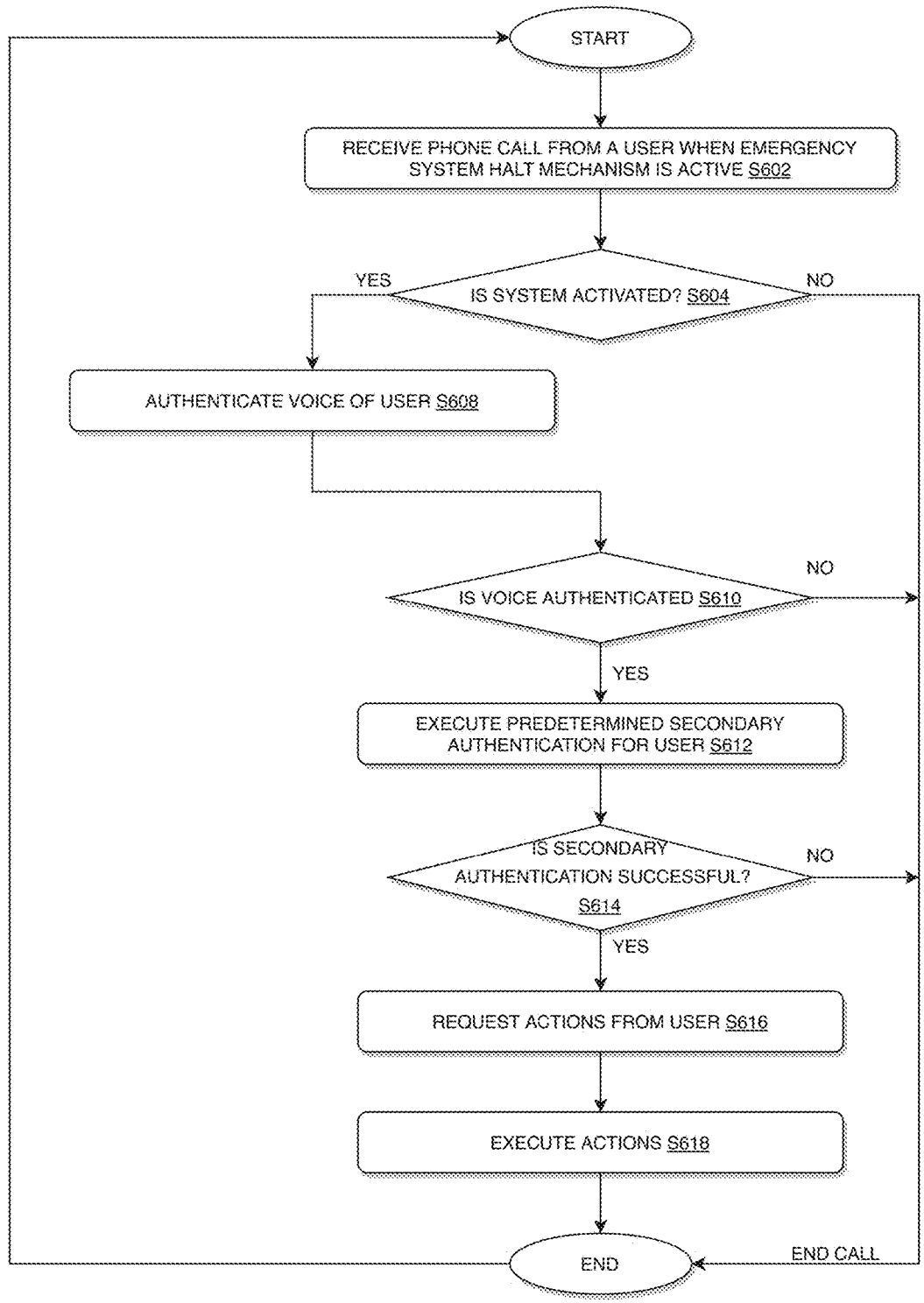
FIG. 6 illustrates a flow chart for implementing an emergency system halt mechanism in accordance with another exemplary embodiment.

FIG. 6 illustrates a flow chart for implementing an emergency system halt mechanism in accordance with another exemplary embodiment.

It will be appreciated that the illustrated process 600 and associated steps may be performed in a different order, with illustrated steps omitted, with additional steps added, or with a combination of reordered, combined, omitted, or additional steps.

According to exemplary embodiments, at step S602, the process 600 receives a phone call from a user when the ESHM is active. At step S604, the process 600 determines whether the system (i.e., the ESHM) is activated upon detection of a disaster and/or a cyber scenario based on analyzing received data and using pre-determined rules and artificial intelligence (AI)/machine learning (ML) models.

In step S604, if it is determined that the ESHM is activated, at step S608, the process 600 proceeds to authenticate voice of the user who initiated the call.

In step S604, if it is determined that the ESHM is not activated, the process 600 proceeds to end the call.

In step S610, the process 600 determines whether the voice of the user who initiated the call is authenticated or not.

In step S610, if it is determined that the voice of the user who initiated the call is authentic, at step S612, the process 600 executes a predetermined secondary authentication process for the user who initiated the call. In step S610 if it is determined that the voice of the user who initiated the call is not authentic, the process 600 proceeds to end the call.

At step S614, the process 600 determines whether the secondary authentication process is successful or not.

In step S614, if it is determined that the secondary authentication process is successful, at step S616, the process 600 requests actions (e.g., halt one or more critical systems; restart one or more critical systems; halt all of the critical systems, etc., but the disclosure is not limited thereto) from the user. At step S618, the process 600 executes the requested actions.

In step S614, if it is determined that the secondary authentication process is not successful, the process 600 proceeds to end the call.

According to exemplary embodiments, a non-transitory computer readable medium may be configured to store instructions for implementing the ESHM 406, but the disclosure is not limited thereto. According to exemplary embodiments, the instructions, when executed, may cause a processor embedded within the ESHM 406 to perform the following: receiving data related to disaster and/or cyber scenarios from a plurality of data sources; determining, by utilizing an intelligent activation system (IAS), whether to activate an emergency system halt mechanism upon detection of a disaster and/or a cyber scenario based on analyzing the received data and using pre-determined rules and artificial intelligence (AI)/machine learning (ML) models; and automatically determining whether to activate or deactivate the emergency system halt mechanism based on a result of determination of the IAS. The processor may be the same or similar to the processor 104 as illustrated in FIG. 1 or the processor embedded within ESHM 202, ESHM 302, and ESHM 406.

According to exemplary embodiments, the instructions, when executed, may further cause the processor 104 to perform the following: automatically activating the emergency system halt mechanism upon positive detection of the disaster and/or the cyber scenario based on analyzing the received data and using the pre-determined rules and artificial intelligence (AI)/machine learning (ML) models.

According to exemplary embodiments, wherein the emergency system halt mechanism is deactivated by default, and the instructions, when executed, may further cause the processor 104 to perform the following: maintaining deactivated status of the emergency system halt mechanism upon negative detection of the disaster and/or the cyber scenario based on analyzing the received data and using the pre-determined rules and artificial intelligence (AI)/machine learning (ML) models; and automatically deactivating an active emergency system halt mechanism based upon negative detection of the disaster and/or the cyber scenario based on analyzing the received data and using the pre-determined rules and artificial intelligence (AI)/machine learning (ML) models.

According to exemplary embodiments, the instructions, when executed, may further cause the processor 104 to perform the following: preregistering users for voice authentication and secondary authentication; notifying the preregistered users upon detection of activation change of the emergency system halt mechanism via electronic messaging or automated voice call to corresponding registered devices of the preregistered users; and receiving a call from a preregistered user among the preregistered users by the emergency system halt mechanism to restart, or take other desired action on one or more critical systems.

According to exemplary embodiments, wherein, when it is determined that the emergency system halt mechanism is activated, the instructions, when executed, may further cause the processor 104 to perform the following: verifying the voice authentication and secondary authentication of the preregistered user who initiated the call; and automatically accepting an instruction to halt or take other desired action on one or more critical systems upon successful verification of the voice authentication and secondary authentication of the preregistered user who initiated the call.

According to exemplary embodiments, wherein, when it is determined that the emergency system halt mechanism is deactivated, the instructions, when executed, may further cause the processor 104 to perform the following: automatically rejecting the received call to the emergency system halt mechanism; maintaining deactivation status of the emergency system halt mechanism; and notifying status information of the IAS and the emergency system halt mechanism to a corresponding registered device of the preregistered user who initiated the call and to a management console.

According to exemplary embodiments as disclosed above in FIGS. 1-6, technical improvements effected by the instant disclosure may include platforms for implementing an emergency system halt mechanism for automatically deactivating, upon detection of a disaster or a cyber scenario, protected authenticated critical systems for a predetermined amount of time, but the disclosure is not limited thereto. According to exemplary embodiments as disclosed above in FIGS. 1-6, technical improvements effected by the instant disclosure may further include platforms for implementing an emergency system halt mechanism for automatically activating, upon detection of a disaster or a cyber scenario by an intelligent activation system (IAS) that automatically triggers activation of protected authenticated emergency system halt mechanism to initiate system halt for a predetermined amount of time by utilizing rules and artificial intelligence (AI)/machine learning (ML) models, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed, rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing an emergency system halt mechanism by utilizing one or more processors and one or more memories, the method comprising:
   receiving data related to disaster and/or cyber scenarios from a plurality of data sources;
   determining, by an intelligent activation system (IAS), whether to activate an emergency system halt mechanism (ESHM) upon detection of a disaster and/or a cyber scenario based on analyzing the received data and using pre-determined rules and artificial intelligence (AI)/machine learning (ML) models;
   preregistering users for voice authentication and secondary authentication;
   notifying the preregistered users upon detection of activation change of the ESHM via electronic messaging or automated voice call to corresponding registered devices of the preregistered users; and
   receiving a call from a preregistered user among the preregistered users by the ESHM to restart, or take other desired action on one or more critical systems.

2. The method according to claim 1, further comprising:
   automatically activating the ESHM upon positive detection of the disaster and/or the cyber scenario based on analyzing the received data and using the pre-determined rules and artificial intelligence (AI)/machine learning (ML) models.

3. The method according to claim 1, wherein the ESHM is deactivated by default, and the method further comprising:
   maintaining deactivated status of the ESHM upon negative detection of the disaster and/or the cyber scenario based on analyzing the received data and using the pre-determined rules and artificial intelligence (AI)/machine learning (ML) models; and
   automatically deactivating an active emergency system halt mechanism based upon negative detection of the disaster and/or the cyber scenario based on analyzing the received data and using the pre-determined rules and artificial intelligence (AI)/machine learning (ML) models.

4. The method according to claim 1, wherein the plurality of data sources include one or more of the following: disaster notification services, cyber management systems, news media, and automated network scanners to detect anomalies.

5. The method according to claim 1, further comprising:
   receiving input via a management console to control activation or deactivation of the ESHM.

6. The method according to claim 1, wherein, when it is determined that the ESHM is activated, the method further comprising:

verifying the voice authentication and secondary authentication of the preregistered user who initiated the call; and automatically accepting an instruction to halt or take other desired action on the one or more critical systems upon successful verification of the voice authentication and secondary authentication of the preregistered user who initiated the call.

7. The method according to claim 1, when it is determined that the ESHM is deactivated, the method further comprising:

automatically rejecting the received call to the ESHM;
maintaining deactivation status of the ESHM; and
notifying status information of the ESHM to a corresponding registered device of the preregistered user who initiated the call and to a management console.

8. A system for implementing an emergency system halt mechanism, comprising:

a plurality of data sources including memories; and
a processor operatively connected to the plurality of data sources via a communication network, wherein the processor is configured to:
receive data related to disaster and/or cyber scenarios from a plurality of data sources;
determine, by utilizing an intelligent activation system (IAS), whether to activate an emergency system halt mechanism (ESHM) upon detection of a disaster and/or a cyber scenario based on analyzing the received data and using pre-determined rules and artificial intelligence (AI)/machine learning (ML) models;
automatically determine whether to activate or deactivate the ESHM based on a result of determination of the IAS;
preregister users for voice authentication and secondary authentication;
notify the preregistered users upon detection of activation change of the ESHM via electronic messaging or automated voice call to corresponding registered devices of the preregistered users; and
receive a call from a preregistered user among the preregistered users by the ESHM to restart, or take other desired action on one or more critical systems.

9. The system according to claim 8, wherein the processor is further configured to:
automatically activate the ESHM upon positive detection of the disaster and/or the cyber scenario based on analyzing the received data and using the pre-determined rules and artificial intelligence (AI)/machine learning (ML) models.

10. The system according to claim 8, wherein the ESHM is deactivated by default, and the processor is further configured to:
maintain deactivated status of the ESHM upon negative detection of the disaster and/or the cyber scenario based on analyzing the received data and using the pre-determined rules and artificial intelligence (AI)/machine learning (ML) models; and
automatically deactivate an active emergency system halt mechanism based upon negative detection of the disaster and/or the cyber scenario based on analyzing the received data and using the pre-determined rules and artificial intelligence (AI)/machine learning (ML) models.

11. The system according to claim 8, wherein the plurality of data sources include one or more of the following: disaster notification services, cyber management systems, news media, and automated network scanners to detect anomalies.

12. The system according to claim 8, wherein the processor is further configured to:
receive input via a management console to control activation or deactivation of the ESHM.

13. The system according to claim 8, wherein, when it is determined that the ESHM is activated, the processor is further configured to:
verify the voice authentication and secondary authentication of the preregistered user who initiated the call; and
automatically accept an instruction to halt or take other desired action on the one or more critical systems upon successful verification of the voice authentication and secondary authentication of the preregistered user who initiated the call.

14. The system according to claim 8, when it is determined that the ESHM is deactivated, the processor is further configured to:
automatically reject the received call to the ESHM;
maintain deactivation status of the ESHM; and
notify status information of the ESHM to a corresponding registered device of the preregistered user who initiated the call and to a management console.

15. A non-transitory computer readable medium configured to store instructions for implementing an emergency system, wherein, when executed, the instructions cause a processor to perform the following:
receiving data related to disaster and/or cyber scenarios from a plurality of data sources;
determining, by utilizing an intelligent activation system (IAS), whether to activate an emergency system halt mechanism (ESHM) upon detection of a disaster and/or a cyber scenario based on analyzing the received data and using pre-determined rules and artificial intelligence (AI)/machine learning (ML) models;
automatically determining whether to activate or deactivate the ESHM based on a result of determination of the IAS;
preregistering users for voice authentication and secondary authentication;
notifying the preregistered users upon detection of activation change of the ESHM via electronic messaging or automated voice call to corresponding registered devices of the preregistered users; and
receiving a call from a preregistered user among the preregistered users by the ESHM to restart, or take other desired action on one or more critical systems.

16. The non-transitory computer readable medium according to claim 15, wherein the instructions, when executed, further cause the processor to perform the following:
automatically activating the ESHM upon positive detection of the disaster and/or the cyber scenario based on analyzing the received data and using the pre-determined rules and artificial intelligence (AI)/machine learning (ML) models.

17. The non-transitory computer readable medium according to claim 15, wherein the ESHM is deactivated by default, and the instructions, when executed, further cause the processor to perform the following:
maintaining deactivated status of the ESHM upon negative detection of the disaster and/or the cyber scenario based on analyzing the received data and using the pre-determined rules and artificial intelligence (AI)/machine learning (ML) models; and automatically deactivating an active emergency system halt mechanism based upon negative detection of the disaster and/or the cyber scenario based on analyzing the received data and using the pre-determined rules and artificial intelligence (AI)/machine learning (ML) models.

18. The non-transitory computer readable medium according to claim 15, wherein the plurality of data sources include one or more of the following: disaster notification services, cyber management systems, news media, and automated network scanners to detect anomalies.

\* \* \* \* \*